(12) United States Patent
Palmer

(10) Patent No.: US 12,639,206 B2
(45) Date of Patent: May 26, 2026

(54) PARTITIONED CACHE FOR RANDOM READ OPERATIONS

(71) Applicant: Micron Technology, Inc., Boise, ID (US)

(72) Inventor: David Aaron Palmer, Boise, ID (US)

(73) Assignee: Micron Technology, Inc., Bosie, ID (US)

( * ) Notice: Subject to any disclaimer, the term of this patent is extended or adjusted under 35 U.S.C. 154(b) by 2 days.

(21) Appl. No.: 18/581,270

(22) Filed: Feb. 19, 2024

(65) Prior Publication Data

US 2024/0281369 A1 Aug. 22, 2024

Related U.S. Application Data

(60) Provisional application No. 63/447,529, filed on Feb. 22, 2023.

(51) Int. Cl.
*G06F 12/02* (2006.01)
*G06F 13/16* (2006.01)

(52) U.S. Cl.
CPC ...... *G06F 12/0246* (2013.01); *G06F 12/0261* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 8,972,694 B1* | 3/2015 | Dolan | ...................... | G06F 16/18 |
| | | | | 711/170 |
| 2001/0001872 A1* | 5/2001 | Singh | .................... | G06F 12/127 |
| | | | | 711/E12.043 |
| 2004/0030847 A1* | 2/2004 | Tremaine | ................ | G06F 12/08 |
| | | | | 711/158 |
| 2012/0110239 A1* | 5/2012 | Goss | .................... | G06F 12/0804 |
| | | | | 711/E12.001 |
| 2013/0185475 A1* | 7/2013 | Talagala | .............. | G06F 12/0866 |
| | | | | 711/102 |
| 2019/0286570 A1* | 9/2019 | Miura | .................. | G06F 12/0246 |
| 2021/0004157 A1* | 1/2021 | O Mahony | ........... | G06F 3/0626 |
| 2023/0297382 A1* | 9/2023 | Abali | .................. | G06F 12/0802 |
| | | | | 712/220 |

* cited by examiner

*Primary Examiner* — Jared I Rutz
*Assistant Examiner* — Alexander J Yoon
(74) *Attorney, Agent, or Firm* — Holland & Hart LLP

(57) ABSTRACT

Methods, systems, and devices for a partitioned cache for random read operations are described. Implementations may determine a target compression factor that is used during read operations. Larger compression factors may be associated with more frequent penalties, but may allow for a larger high-performance benchmark on a large address range. As described herein, a compression factor may indicate certain mappings that are stored to a volatile memory. The compression factor may be chosen at product design time or may be chosen dynamically at run time based on statistics such as extended cache hit or miss rate. If a read command associated with a logical block address not stored by the volatile memory is received, the memory system may "guess" the physical address by assuming that data was written to the memory system sequentially. If the data is correct, the data may be read out to the host system.

20 Claims, 5 Drawing Sheets

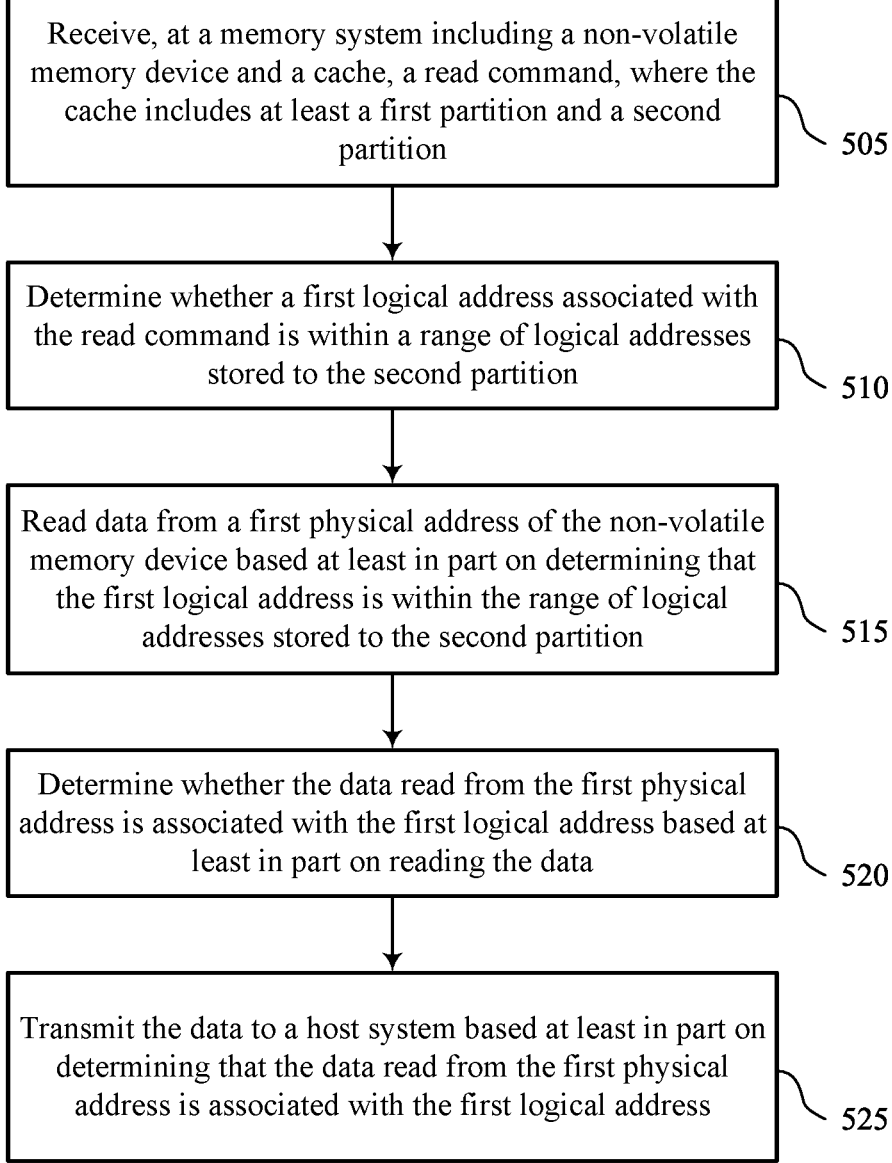

Receive, at a memory system including a non-volatile memory device and a cache, a read command, where the cache includes at least a first partition and a second partition

505

Determine whether a first logical address associated with the read command is within a range of logical addresses stored to the second partition

510

Read data from a first physical address of the non-volatile memory device based at least in part on determining that the first logical address is within the range of logical addresses stored to the second partition

515

Determine whether the data read from the first physical address is associated with the first logical address based at least in part on reading the data

520

Transmit the data to a host system based at least in part on determining that the data read from the first physical address is associated with the first logical address

PARTITIONED CACHE FOR RANDOM READ OPERATIONS

CROSS REFERENCE

The present application for patent claims priority to and the benefit of U.S. Provisional Application No. 63/447,529 by Palmer et al., entitled "PARTITIONED CACHE FOR RANDOM READ OPERATIONS," filed Feb. 22, 2023, assigned to the assignee hereof, and is expressly incorporated by reference in its entirety in its entirety herein.

TECHNICAL FIELD

The following relates to one or more systems for memory, including a partitioned cache for random read operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 5 illustrates a flowchart showing a method or methods that support a partitioned cache for random read operations in accordance with examples as disclosed herein.

DETAILED DESCRIPTION

Figure 1:
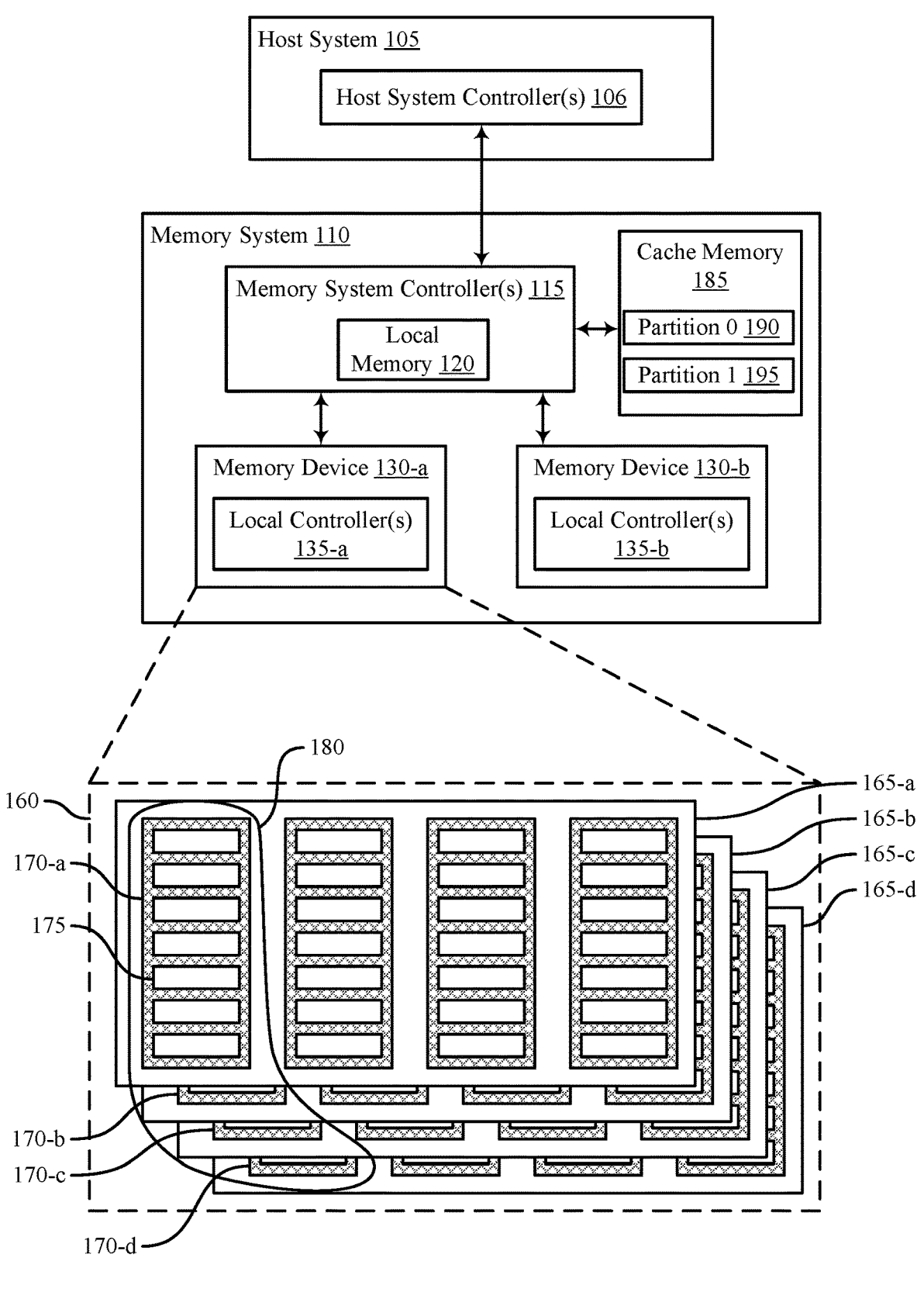
FIG. 1 illustrates an example of a system that supports a partitioned cache for random read operations in accordance with examples as disclosed herein.

Methods, systems, and devices for a partitioned cache for random read operations are described. While non-volatile memory (e.g., non-AND (NAND) memory) has a large erase granularity, it may have a smaller write granularity and an even smaller read granularity. For example, the size of the memory blocks that can be written to or read from the NAND memory may be smaller than the size of the memory blocks that can be erased in the NAND memory. To facilitate placement of write data, a mapping table maps logical block addresses (LBAs) to physical page addresses (PPAs) in the NAND memory. This association between LBAs and corresponding PPAs creates a Logical to Physical (L2P) mapping table.

L2P tables may be quite large and may be stored in volatile memory. However, managed NAND (mNAND) devices may not include sufficient quantities of volatile memory (e.g., SRAM) to store the full table. A cache may be used that may store only a portion of the L2P table.

It may be desirable to achieve a high cache hit rate across large address ranges when performing benchmark operations (e.g., benchmark testing operations). Using large L2P tables may promote high cache hit rates. However, storage of large L2P map tables may utilize large amounts of SRAM. It may be cost prohibitive to provide sufficient quantities of SRAM on mNAND devices to store relatively large L2P tables to ensure high cache hit rates. Accordingly, it may be desirable to provide a high cache hit rate during a benchmark operation without increasing the quantity of SRAM at the mNAND device.

Implementations described herein address the aforementioned shortcomings and other shortcomings by determining a target compression factor (e.g., 4) that is used during read operations (e.g., random read operations, benchmark read operations). Larger compression factors may be associated with higher cache miss rates, but may allow for a relatively high-performance benchmark on a large address range. As described herein, a compression factor may indicate certain mappings that are stored to a volatile memory. The compression factor may be chosen at product design time or may be chosen dynamically at run time based on one or more characteristics of the memory device. For example, if a compression factor of 4 is chosen, a 4-byte pointer in the L2P cache may point to a 16 KB aligned address. That is, if a compression factor of 4 is chosen, a mapping between every fourth logical address and a corresponding physical address may be stored to the volatile memory. Accordingly, if a read command associated with an LBA not stored the volatile memory is received, the memory system may "guess" the physical address by assuming that data was written to the memory system sequentially. If the data is correct, the data may be read out to the host system, which may improve the overall latency and performance of the memory system.

In addition to applicability in memory systems as described herein, techniques for an improved partitioned cache for random read operations may be generally implemented to improve the performance of various electronic devices and systems (including artificial intelligence (AI)

applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more random read operations, which may decrease processing or latency times, improve response times, or otherwise improve user experience, among other benefits.

Features of the disclosure are initially described in the context of systems, devices, and circuits with reference to FIG. 1. Features of the disclosure are described in the context of flowcharts and a memory device with reference to FIGS. 2 and 3. These and other features of the disclosure are further illustrated by and described in the context of an apparatus diagram and flowchart that relate to a partitioned cache for random read operations with reference to FIGS. 4 and 5.

FIG. 1 illustrates an example of a system 100 that supports a partitioned cache for random read operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), one or more memory controllers (e.g., NVDIMM controller), and one or more storage protocol controllers (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between LBAs associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include SRAM or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support a partitioned cache for random read operations. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some implementations, the memory system 110 (e.g., the memory system controller 115 and/or a local controller 135) may determine a target compression factor that may be used during read operations, such as random read operations (e.g., benchmark read operations). Larger compression factors may be associated with relatively higher cache miss rates compared to smaller compression factors, but may allow for a larger high performance benchmark on a relatively large address range. As described herein, a compression factor may indicate certain mappings that are stored to a volatile memory, such as the local memory 120. The compression factor may be chosen at product design time or may be chosen dynamically at run time based on one or more characteristics of the memory system 110. As an example, if a compression factor of 4 is chosen, a 4-byte pointer in the L2P cache may point to a 16 KB aligned address. If a compression factor of 4 is chosen, a mapping between every fourth logical address and a corresponding physical address may be stored to the volatile memory (e.g., to the local memory 120). If a read command associated with a LBA not stored to the volatile memory (e.g., the local memory 120) is received, the memory system 110 may determine the physical address by assuming that data was written to the memory system 110 sequentially. If the data is correct, the data may be read out to the host system, which may improve the overall latency and performance of the memory system 110.

In some examples, the memory system 110 may include a cache memory 185. The cache memory 185 be implemented as a volatile cache including one or more memory cells. The memory cells may be implemented, for example, as SRAM memory cells. The cache memory 185 may be partitioned into at least two partitions. A first partition 190 (e.g., partition 0) may store a L2P table that maps LBAs utilized by a host to physical block addresses (PPAs) utilized by a volatile memory device (e.g., a NAND memory device). In some examples, the L2P table may be characterized by an L2P to mapped data ratio of 1:1024. For example, a 4-byte pointer representing the LBA may map to a 4096-byte LBA. Accordingly, 1 MB of cache memory may be utilized to map 1 GB user data area.

A second partition 195 (e.g., partition 1) may store a L2P table characterized by a compression factor (e.g., 4) that is used during read operations (e.g., random read operations, benchmark read operations). For example, the compression factor may be utilized to determine which pointer values to check in a volatile memory device, such as a SRAM, when determining whether a requested LBA is present in a memory device. Larger compression factors may be associated with more frequent penalties (e.g., higher cache miss rates), but may allow for a larger high-performance benchmark on a large address range. As described herein, a compression factor may indicate certain mappings that are stored to a volatile memory device.

The compression factor may be chosen at product design time or may be chosen dynamically at run time based on statistics such as extended cache hit or miss rate. For example, if a compression factor of 4 is chosen, a 4-byte pointer in the L2P cache SRAM may point to a 16 KB aligned address. That is, if a compression factor of 4 is chosen, a mapping between every fourth logical address and a corresponding physical address may be stored to the volatile memory. Accordingly, if a read command associated with an LBA not stored the volatile memory is received, the memory system may "guess" the physical address by assuming that data was written to the memory system sequentially. If the data is correct, the data may be read out to the host system, which may improve the overall latency and performance of the memory system.

In some examples, the memory system controller 115 may determine whether the LBA is stored to the first partition 190. If the LBA is stored to the first partition 190, the data may be read using that LBA (e.g., using the mapping stored to the first partition 190). On the other hand, if the LBA is not stored to the first partition 190, the memory system controller 115 may access the second partition 195 (e.g., using the compression factor) to read data from the memory device 130.

As an additional example, the compression factor may be N. A mapping associated with every Nth LBA may be stored to the SRAM. If a read command associated with LBA N+1 is received, the memory system may identify the physical address associated with LBA N (e.g., physical block address (PBA) N) and may read PBA N+1. That is, the memory system may assume that PBAs N and N+1 were written sequentially. If the data is correct (e.g., a cache hit), the data may be read out to the host system 105, which may improve system latency and performance.

In some examples, the compression factor is chosen dynamically at run time. For example, the compression factor may be adjusted based on statistics such as an extended cache hit or miss rate that is determined over a period of time. If an extended cache miss rate exceeds a threshold, the current compression factor may be too large and may be decreased. In some examples, one or more statistics are periodically determined, and the compression factor may be adjusted based on the statistics.

Figure 2:
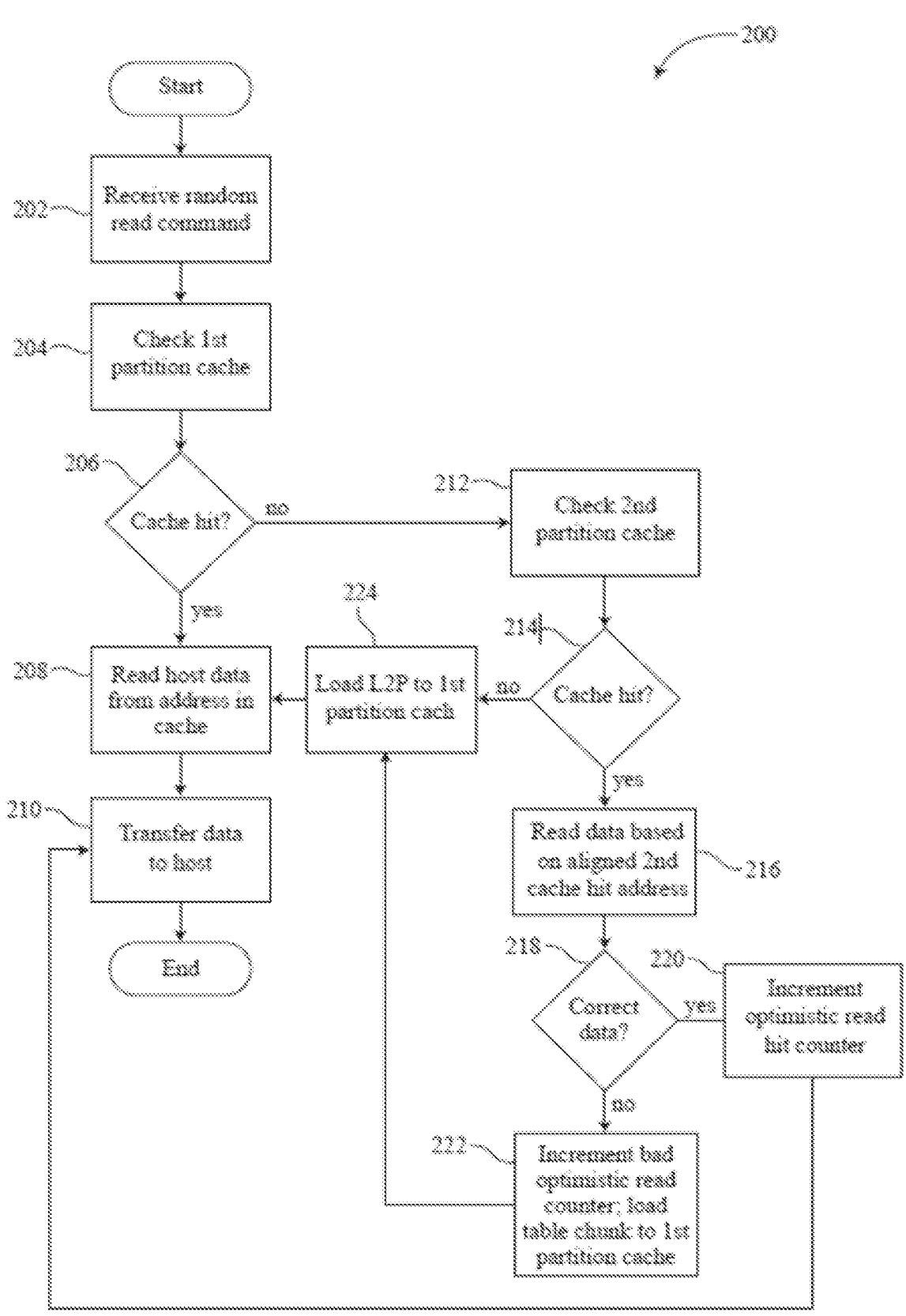
FIG. 2 illustrates an example of a flowchart showing a method or methods that support a partitioned cache for random read operations in accordance with examples as disclosed herein.

FIG. 2 illustrates an example of a flowchart 200 showing a method or methods that support a partitioned cache for random read operations in accordance with examples as disclosed herein. Aspects of the method or methods may be implemented by a controller, among other components. Additionally or alternatively, aspects of the method or methods may be implemented as instructions stored in memory (e.g., firmware stored in a memory coupled with a memory system controller. For example, the instructions, when executed by a controller (e.g., the memory system controller 115), may cause the controller to perform the operations of the method or methods. The controller may access a L2P table (e.g., associated with or using a target compression factor), which may improve the overall latency and performance of the associated memory system.

At 202, a random read command is received. The random read command may be received, for example, while the memory system 110 is operating in a benchmark mode. For example, a memory system (e.g., the memory system 110) may receive the random read command from a host system (e.g., the host system 105). The random read command may be received by the controller (e.g., the memory system controller 115) of the memory system. In some implementations, the random read command may indicate a LBA of the memory system to read data from.

At 204, a first partition (e.g., partition 0) of a cache may be checked for the requested LBA. For example, at 206, the memory system controller 115 may determine whether the first partition of the cache includes the requested LBA. If the first partition of the cache includes the requested LBA, host data may be read at 208 from a physical block (e.g., a physical block address) of a non-volatile memory device (e.g., a NAND memory device). For example, the memory system controller 115 may utilize a L2P table stored in the first partition cache to map the LBA to a physical page address (PPA). The memory system controller 115 may obtain the data corresponding to the physical block address. At 210, the data may be transferred to the host (e.g., the host system 105). For example, the memory system controller 115 may transfer the data to the host system controller 106.

Referring again to 206, if the first partition (e.g., partition 0) of the cache does not include the requested LBA, a second partition (e.g., partition 1) of the cache may be checked for the requested LBA at 212. In some examples, the check of the second partition of the cache may be associated with a compression factor. For example, if the compression factor is 4 and the requested LBA is 13, the controller may check the second partition of the cache for the LBA corresponding to the closest multiple of the compression factor, e.g., LBA 12.

At 214, a determination may be made as to whether a cache hit or a cache miss has occurred. For example, a controller may determine whether the second partition cache includes the LBA that is associated with the compression factor and is within a threshold range of the requested LBA. If the controller determines that the second partition cache includes an LBA, associated with the compression factor, that is within a threshold range of the requested LBA, data may be read at 216. For example, host data may be read from a physical block address of the non-volatile memory device. For example, the controller may utilize a L2P table stored in the second partition cache to map the LBA to a physical block address. The controller may obtain the data corresponding to the physical block address.

In some examples, a performance metric may be determined in connection with the compression factor. For example, a ratio between the number of cache hits and cache misses may be determined. At 218, a determination may be made as to whether the data read from the non-volatile memory is correct. As described herein, the controller may read the data from the non-volatile memory, using the compression factor, by assuming that data was previously written to the non-volatile memory sequentially. For example, if the compression factor is 4, then the L2P table may store a mapping associated with LBA 12. If the received LBA is LBA 13, the controller may presume that LBA 13 is written sequentially to LBA 12. At 218, for example, a determination may be made as to whether the data read from the presumed location of LBA 13 is correct. If the data is correct, at 220, a first counter that tracks read hits may be incremented. At 210, the data may be transferred to the host (e.g., the host system 105). For example, the memory system controller 115 may transfer the data to the host system controller 106.

If the data is incorrect, at 222, a second counter that tracks read misses may be incremented. At 224, a portion of the L2P table may be loaded to the first partition cache (e.g., partition 0) based on the second counter being incremented. Accordingly, the correct data may be read at 208 from a physical block address of the non-volatile memory. The memory system controller 115 may obtain the data corresponding to the physical block address. At 210, the data may be transferred to the host (e.g., the host system 105). For example, the memory system controller 115 may transfer the data to the host system controller 106. By utilizing cache partitions and a compression factor in this manner, the overall latency and performance of the associated memory system may be improved.

Figure 3:
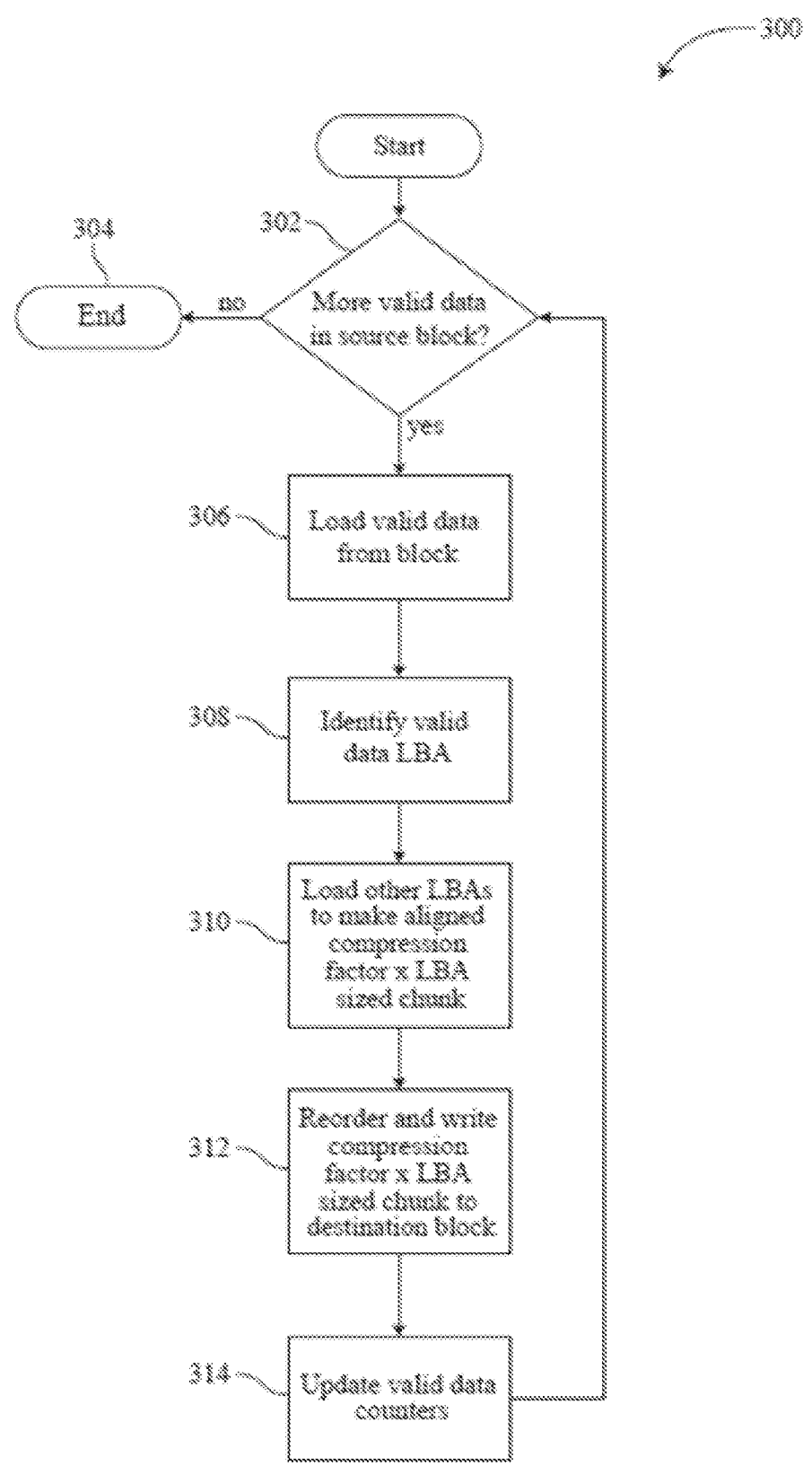
FIG. 3 illustrates an example of a flowchart showing a method or methods that support a partitioned cache for random read operations in accordance with examples as disclosed herein.

FIG. 3 illustrates an example of a flowchart 300 showing a method or methods that support a partitioned cache for random read operations in accordance with examples as disclosed herein. Memory reclamation may be performed, for example, to promote separation of data. Aspects of the method or methods may be implemented by a controller, among other components. Additionally or alternatively, aspects of the method or methods may be implemented as instructions stored in memory (e.g., firmware stored in a memory coupled with a memory system controller. For example, the instructions, when executed by a controller (e.g., the memory system controller 115), may cause the controller to perform the operations of the method or methods.

At 302, a determination may be made as to whether valid data is present in a source block. If no valid data is present in the source block, the memory reclamation method or methods may conclude at 304. If valid data is present in the source block, the valid data may be loaded from the source block at 306. At 308, a LBA associated with the valid data may be identified. At 310, one or more other LBAs may be loaded to facilitate formation of a group of contiguous memory blocks. The group of contiguous memory blocks may be of a size equal to the compression factor multiplied by the size of the LBA, for example. This may facilitate creation of groups of memory blocks that are aligned to the compression factor. At 312, data may be reordered and written to a destination block. For example, a controller may ensure that the data is in the correct order and may write a group of contiguous memory blocks to the destination block. The group of contiguous memory blocks may be of a size equal to the compression factor multiplied by the size of the LBA. At 314, a counter that tracks valid data may be updated. Processing may return to 302 and repeat until no additional valid data remains in source blocks. By utilizing cache partitions and a compression factor in this manner, the overall latency and performance of the associated memory system may be improved.

Figure 4:
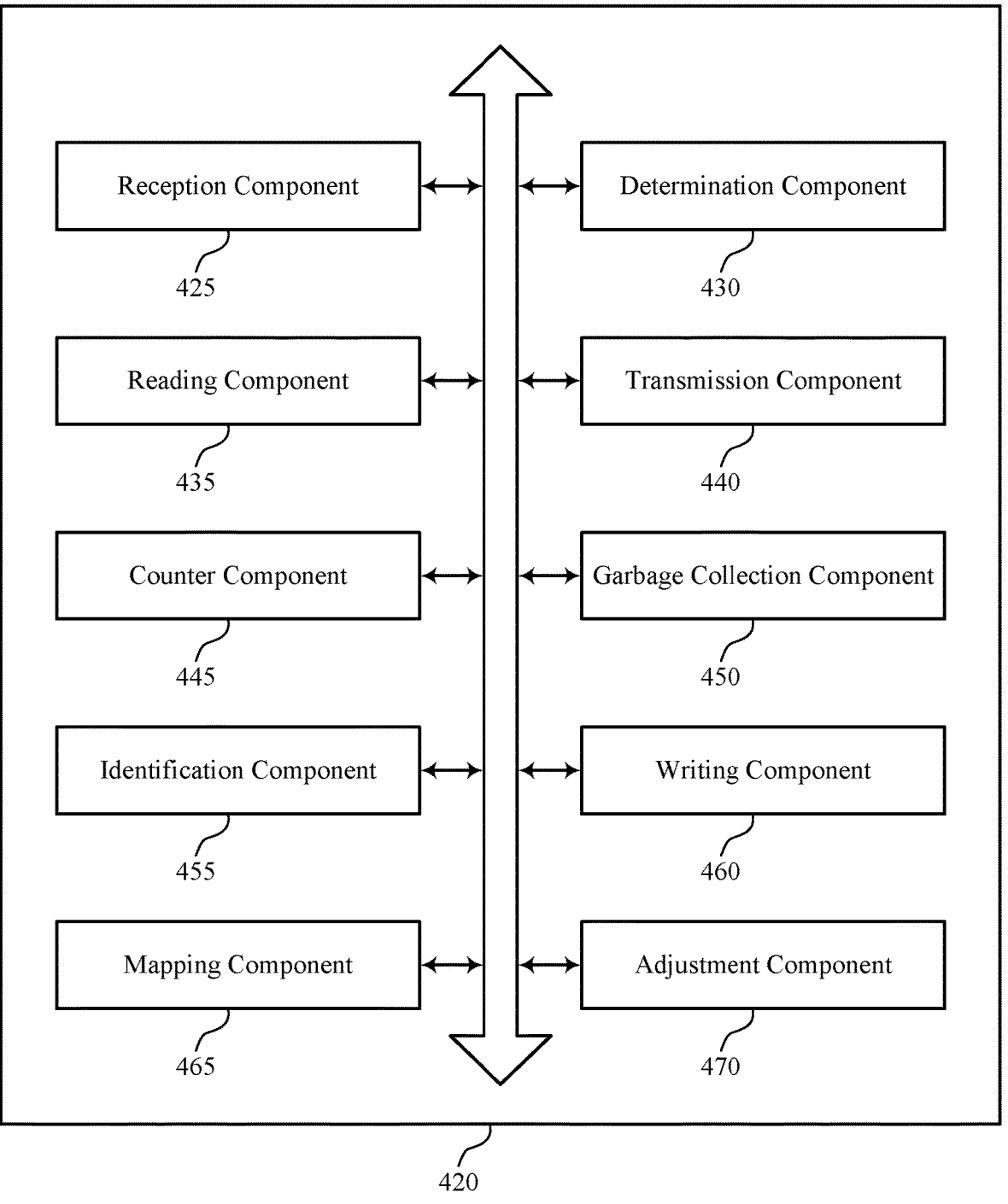
FIG. 4 illustrates a block diagram of a memory system that supports a partitioned cache for random read operations in accordance with examples as disclosed herein.

FIG. 4 illustrates a block diagram 400 of a memory system 420 that supports a partitioned cache for random read operations in accordance with examples as disclosed herein. The memory system 420 may be an example of aspects of a memory system as described with reference to FIGS. 1 through 3. The memory system 420, or various components thereof, may be an example of means for performing various aspects of a partitioned cache for random read operations as described herein. For example, the memory system 420 may include a reception component 425, a determination component 430, a reading component 435, a transmission component 440, a counter component 445, a garbage collection component 450, an identification component 455, a writing component 460, a mapping component 465, an adjustment component 470, or any combination thereof. Each of these components may communicate, directly or indirectly, with one another (e.g., via one or more buses).

The reception component 425 may be configured as or otherwise support a means for receiving, at a memory system including a non-volatile memory device and a cache, a read command, where the cache includes at least a first partition and a second partition. The determination component 430 may be configured as or otherwise support a means for determining whether a first logical address associated with the read command is within a range of logical addresses stored to the second partition. The reading component 435 may be configured as or otherwise support a means for reading data from a first physical address of the non-volatile memory device based at least in part on determining that the first logical address is within the range of logical addresses stored to the second partition. In some examples, the determination component 430 may be configured as or otherwise support a means for determining whether the data read from the first physical address is associated with the first logical address based at least in part on reading the data. The transmission component 440 may be configured as or otherwise support a means for transmitting the data to a host system based at least in part on determining that the data read from the first physical address is associated with the first logical address.

In some examples, to support reading the data from the first physical address of the non-volatile memory device, the determination component 430 may be configured as or otherwise support a means for determining that a second logical address is stored to the second partition that is close to the first logical address based at least in part on a compression factor associated with the second partition, where the second logical address is associated with a second physical address different than the first physical address.

In some examples, the determination component 430 may be configured as or otherwise support a means for determining a difference between the first logical address and the second logical address based at least in part on determining that the first logical address associated with the read command is within the range of logical addresses stored to the second partition. In some examples, the identification component 455 may be configured as or otherwise support a means for identifying the second physical address associated with the second logical address based at least in part on determining the difference between the first logical address and the second logical address. In some examples, the identification component 455 may be configured as or otherwise support a means for identifying the first physical address based at least in part on identifying the second physical address associated with the second logical address and the difference between the first logical address and the second logical address.

In some examples, the first logical address and the second logical address are sequential logical addresses.

In some examples, a quantity of logical addresses exist between the first logical address and the second logical address. In some examples, the quantity of logical addresses is associated with the compression factor.

In some examples, the determination component 430 may be configured as or otherwise support a means for determining that the data read from the first physical address is not associated with the first logical address. In some examples, the counter component 445 may be configured as or otherwise support a means for incrementing a first counter associated with the memory system based at least in part on determining that the data read from the first physical address is not associated with the first logical address.

In some examples, the mapping component 465 may be configured as or otherwise support a means for loading a mapping between the first logical address and a third physical address of the non-volatile memory device to the first partition based at least in part on incrementing the first counter. In some examples, the reading component 435 may be configured as or otherwise support a means for reading second data from the third physical address based at least in part on loading the mapping. In some examples, the transmission component 440 may be configured as or otherwise support a means for transmitting the second data to the host system based at least in part on reading the second data from the third physical address.

In some examples, the determination component 430 may be configured as or otherwise support a means for determining that a value of the first counter satisfies a threshold value. In some examples, the adjustment component 470 may be configured as or otherwise support a means for adjusting a compression factor associated with the second partition based at least in part on determining that the value of the first counter satisfies the threshold value.

In some examples, the counter component 445 may be configured as or otherwise support a means for incrementing a second counter associated with the memory system based at least in part on determining that the data read from the first physical address is associated with the first logical address, where transmitting the data to the host system is based at least in part on incrementing the second counter.

In some examples, the garbage collection component 450 may be configured as or otherwise support a means for initiating a garbage collection operation on a first block of memory cells of the non-volatile memory device. In some examples, the identification component 455 may be configured as or otherwise support a means for identifying, during the garbage collection operation, a plurality of logical addresses associated with valid data of the first block of memory cells. In some examples, the writing component 460 may be configured as or otherwise support a means for writing, during the garbage collection operation, the valid data to a second block of memory cells, where the valid data is written based on a sequential order of the plurality of logical addresses.

In some examples, the determination component 430 may be configured as or otherwise support a means for determining that the plurality of logical addresses is non-sequential based at least in part on identifying the plurality of logical addresses. In some examples, the mapping component 465 may be configured as or otherwise support a means for loading a third logical address to the plurality of logical addresses, where the plurality of logical addresses is sequential based at least in part on loading the third logical address.

In some examples, the reception component 425 may be configured as or otherwise support a means for receiving, at the non-volatile memory device, a second read command. In some examples, the determination component 430 may be configured as or otherwise support a means for determining that a fourth logical address associated with the second read command is stored to the first partition. In some examples, the reading component 435 may be configured as or otherwise support a means for reading third data from a fourth physical address of the non-volatile memory device based at least in part on determining that the fourth logical address is stored to the first partition. In some examples, the transmission component 440 may be configured as or otherwise support a means for transmitting the third data to the host system based at least in part on reading the third data from the fourth physical address.

FIG. 5 illustrates a flowchart showing a method 500 that supports a partitioned cache for random read operations in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, at a memory system including a non-volatile memory device and a cache, a read command, where the cache includes at least a first partition and a second partition. The operations of 505 may be performed in accordance with examples as disclosed herein. In some examples, aspects of the operations of 505 may be performed by a reception component 425 as described with reference to FIG. 4.

At 510, the method may include determining whether a first logical address associated with the read command is within a range of logical addresses stored to the second partition. The operations of 510 may be performed in accordance with examples as disclosed herein. In some examples, aspects of the operations of 510 may be performed by a determination component 430 as described with reference to FIG. 4.

At 515, the method may include reading data from a first physical address of the non-volatile memory device based at least in part on determining that the first logical address is within the range of logical addresses stored to the second partition. The operations of 515 may be performed in accordance with examples as disclosed herein. In some examples, aspects of the operations of 515 may be performed by a reading component 435 as described with reference to FIG. 4.

At 520, the method may include determining whether the data read from the first physical address is associated with the first logical address based at least in part on reading the data. The operations of 520 may be performed in accordance with examples as disclosed herein. In some examples, aspects of the operations of 520 may be performed by a determination component 430 as described with reference to FIG. 4.

At 525, the method may include transmitting the data to a host system based at least in part on determining that the data read from the first physical address is associated with the first logical address. The operations of 525 may be performed in accordance with examples as disclosed herein. In some examples, aspects of the operations of 525 may be performed by a transmission component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system including a non-volatile memory device and a cache, a read command, where the cache includes at least a first partition and a second partition; determining whether a first logical address associated with the read command is within a range of logical addresses stored to the second partition; reading data from a first physical address of the non-volatile memory device based at least in part on determining that the first logical address is within the range of logical addresses stored to the second partition; determining whether the data read from the first physical address is associated with the first logical address based at least in part on reading the data; and transmitting the data to a host system based at least in part on determining that the data read from the first physical address is associated with the first logical address.

Aspect 2: The method, apparatus, or non-transitory computer-readable medium of aspect 1, where reading the data from the first physical address of the non-volatile memory device includes operations, features, circuitry, logic, means, or instructions, or any combination thereof for determining that a second logical address is stored to the second partition that is close to the first logical address based at least in part on a compression factor associated with the second partition, where the second logical address is associated with a second physical address different than the first physical address.

Aspect 3: The method, apparatus, or non-transitory computer-readable medium of aspect 2, further including operations, features, circuitry, logic, means, or instructions, or any combination thereof for determining a difference between the first logical address and the second logical address based at least in part on determining that the first logical address associated with the read command is within the range of logical addresses stored to the second partition; identifying the second physical address associated with the second logical address based at least in part on determining the difference between the first logical address and the second logical address; and identifying the first physical address based at least in part on identifying the second physical address associated with the second logical address and the difference between the first logical address and the second logical address.

Aspect 4: The method, apparatus, or non-transitory computer-readable medium of any of aspects 2 through 3, where the first logical address and the second logical address are sequential logical addresses.

Aspect 5: The method, apparatus, or non-transitory computer-readable medium of any of aspects 2 through 4, where a quantity of logical addresses exist between the first logical address and the second logical address and the quantity of logical addresses is associated with the compression factor.

Aspect 6: The method, apparatus, or non-transitory computer-readable medium of any of aspects 1 through 5, further including operations, features, circuitry, logic, means, or instructions, or any combination thereof for determining that the data read from the first physical address is not associated with the first logical address and incrementing a first counter associated with the memory system based at least in part on determining that the data read from the first physical address is not associated with the first logical address.

Aspect 7: The method, apparatus, or non-transitory computer-readable medium of aspect 6, further including operations, features, circuitry, logic, means, or instructions, or any combination thereof for loading a mapping between the first logical address and a third physical address of the non-volatile memory device to the first partition based at least in part on incrementing the first counter; reading second data from the third physical address based at least in part on loading the mapping; and transmitting the second data to the host system based at least in part on reading the second data from the third physical address.

Aspect 8: The method, apparatus, or non-transitory computer-readable medium of any of aspects 6 through 7, further including operations, features, circuitry, logic, means, or instructions, or any combination thereof for determining that a value of the first counter satisfies a threshold value and adjusting a compression factor associated with the second partition based at least in part on determining that the value of the first counter satisfies the threshold value.

Aspect 9: The method, apparatus, or non-transitory computer-readable medium of any of aspects 1 through 8, further including operations, features, circuitry, logic, means, or instructions, or any combination thereof for incrementing a second counter associated with the memory system based at least in part on determining that the data read from the first physical address is associated with the first logical address, where transmitting the data to the host system is based at least in part on incrementing the second counter.

Aspect 10: The method, apparatus, or non-transitory computer-readable medium of any of aspects 1 through 9, further including operations, features, circuitry, logic, means, or instructions, or any combination thereof for initiating a garbage collection operation on a first block of memory cells of the non-volatile memory device; identifying, during the garbage collection operation, a plurality of logical addresses associated with valid data of the first block of memory cells; and writing, during the garbage collection operation, the valid data to a second block of memory cells, where the valid data is written based on a sequential order of the plurality of logical addresses.

Aspect 11: The method, apparatus, or non-transitory computer-readable medium of aspect 10, further including operations, features, circuitry, logic, means, or instructions, or any combination thereof for determining that the plurality of logical addresses are non-sequential based at least in part on identifying the plurality of logical addresses and loading a third logical address to the plurality of logical addresses, where the plurality of logical addresses are sequential based at least in part on loading the third logical address.

Aspect 12: The method, apparatus, or non-transitory computer-readable medium of any of aspects 1 through 11, further including operations, features, circuitry, logic, means, or instructions, or any combination thereof for receiving, at the non-volatile memory device, a second read command; determining that a fourth logical address associated with the second read command is stored to the first partition; reading third data from a fourth physical address of the non-volatile memory device based at least in part on determining that the fourth logical address is stored to the first partition; and transmitting the third data to the host system based at least in part on reading the third data from the fourth physical address.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate.

The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a controller associated with a memory system comprising a non-volatile memory device and a cache, wherein the controller is configured to cause the apparatus to:
      receive a read command, wherein the cache comprises at least a first partition and a second partition, wherein the second partition is associated with a compression factor that is adjustable in accordance with a value of a first counter satisfying a threshold value;
      determine whether a first logical address associated with the read command is within a range of logical addresses stored to the second partition;

read data from a first physical address of the non-volatile memory device based at least in part on determining that the first logical address is within the range of logical addresses stored to the second partition;

determine whether the data read from the first physical address is associated with the first logical address based at least in part on reading the data; and transmit the data to a host system based at least in part on determining that the data read from the first physical address is associated with the first logical address.

2. The apparatus of claim 1, wherein to read the data from the first physical address of the non-volatile memory device the controller is configured to cause the apparatus to:

determine that a second logical address is stored to the second partition that is close to the first logical address based at least in part on the compression factor associated with the second partition, wherein the second logical address is associated with a second physical address different than the first physical address.

3. The apparatus of claim 2, wherein the controller is further configured to cause the apparatus to:

determine a difference between the first logical address and the second logical address based at least in part on determining that the first logical address associated with the read command is within the range of logical addresses stored to the second partition;

identify the second physical address associated with the second logical address based at least in part on determining the difference between the first logical address and the second logical address; and identify the first physical address based at least in part on identifying the second physical address associated with the second logical address and the difference between the first logical address and the second logical address.

4. The apparatus of claim 2, wherein:

the first logical address and the second logical address are sequential logical addresses.

5. The apparatus of claim 2, wherein:

a quantity of logical addresses exist between the first logical address and the second logical address; and the quantity of logical addresses is associated with the compression factor.

6. The apparatus of claim 1, wherein the controller is further configured to cause the apparatus to:

determine that the data read from the first physical address is not associated with the first logical address; and increment the first counter associated with the memory system based at least in part on determining that the data read from the first physical address is not associated with the first logical address.

7. The apparatus of claim 6, wherein the controller is further configured to cause the apparatus to:

load a mapping between the first logical address and a third physical address of the non-volatile memory device to the first partition based at least in part on incrementing the first counter;

read second data from the third physical address based at least in part on loading the mapping; and transmit the second data to the host system based at least in part on reading the second data from the third physical address.

8. The apparatus of claim 6, wherein the controller is further configured to cause the apparatus to:

determine that the value of the first counter satisfies the threshold value; and adjust the compression factor associated with the second partition based at least in part on determining that the value of the first counter satisfies the threshold value.

9. The apparatus of claim 1, wherein the controller is further configured to cause the apparatus to:

increment a second counter associated with the memory system based at least in part on determining that the data read from the first physical address is associated with the first logical address, wherein transmitting the data to the host system is based at least in part on incrementing the second counter.

10. The apparatus of claim 1, wherein the controller is further configured to cause the apparatus to:

initiate a garbage collection operation on a first block of memory cells of the non-volatile memory device;

identify, during the garbage collection operation, a plurality of logical addresses associated with valid data of the first block of memory cells; and write, during the garbage collection operation, the valid data to a second block of memory cells, wherein the valid data is written based on a sequential order of the plurality of logical addresses.

11. The apparatus of claim 10, wherein the controller is further configured to cause the apparatus to:

determine that the plurality of logical addresses are non-sequential based at least in part on identifying the plurality of logical addresses; and load a third logical address to the plurality of logical addresses, wherein the plurality of logical addresses are sequential based at least in part on loading the third logical address.

12. The apparatus of claim 1, wherein the controller is further configured to cause the apparatus to:

receive, at the non-volatile memory device, a second read command;

determine that a fourth logical address associated with the second read command is stored to the first partition;

read third data from a fourth physical address of the non-volatile memory device based at least in part on determining that the fourth logical address is stored to the first partition; and transmit the third data to the host system based at least in part on reading the third data from the fourth physical address.

13. A non-transitory computer-readable medium storing code comprising instructions which, when executed by a processor of an electronic device, cause the electronic device to:

receive, at a memory system comprising a non-volatile memory device and a cache, a read command, wherein the cache comprises at least a first partition and a second partition, wherein the second partition is associated with a compression factor that is adjustable in accordance with a value of a first counter satisfying a threshold value;

determine whether a first logical address associated with the read command is within a range of logical addresses stored to the second partition;

read data from a first physical address of the non-volatile memory device based at least in part on determining that the first logical address is within the range of logical addresses stored to the second partition;

determine whether the data read from the first physical address is associated with the first logical address based at least in part on reading the data; and transmit the data to a host system based at least in part on determining that the data read from the first physical address is associated with the first logical address.

14. The non-transitory computer-readable medium of claim 13, wherein to read the data from the first physical address of the non-volatile memory device the instructions, when executed by the processor of the electronic device, further cause the electronic device to:

determine that a second logical address is stored to the second partition that is close to the first logical address based at least in part on the compression factor associated with the second partition, wherein the second logical address is associated with a second physical address different than the first physical address.

15. The non-transitory computer-readable medium of claim 14, wherein the instructions, when executed by the processor of the electronic device, further cause the electronic device to:

determine a difference between the first logical address and the second logical address based at least in part on determining that the first logical address associated with the read command is within the range of logical addresses stored to the second partition;

identify the second physical address associated with the second logical address based at least in part on determining the difference between the first logical address and the second logical address; and identify the first physical address based at least in part on identifying the second physical address associated with the second logical address and the difference between the first logical address and the second logical address.

16. The non-transitory computer-readable medium of claim 14, wherein:

the first logical address and the second logical address are sequential logical addresses.

17. The non-transitory computer-readable medium of claim 14, wherein:

a quantity of logical addresses exist between the first logical address and the second logical address; and the quantity of logical addresses is associated with the compression factor.

18. The non-transitory computer-readable medium of claim 13, wherein the instructions, when executed by the processor of the electronic device, further cause the electronic device to:

determine that the data read from the first physical address is not associated with the first logical address; and increment the first counter associated with the memory system based at least in part on determining that the data read from the first physical address is not associated with the first logical address.

19. The non-transitory computer-readable medium of claim 18, wherein the instructions, when executed by the processor of the electronic device, further cause the electronic device to:

load a mapping between the first logical address and a third physical address of the non-volatile memory device to the first partition based at least in part on incrementing the first counter;

read second data from the third physical address based at least in part on loading the mapping; and transmit the second data to the host system based at least in part on reading the second data from the third physical address.

20. A method, comprising:

receiving, at a memory system comprising a non-volatile memory device and a cache, a read command, wherein the cache comprises at least a first partition and a second partition, wherein the second partition is associated with a compression factor that is adjustable in accordance with a value of a first counter satisfying a threshold value;

determining whether a first logical address associated with the read command is within a range of logical addresses stored to the second partition;

reading data from a first physical address of the non-volatile memory device based at least in part on determining that the first logical address is within the range of logical addresses stored to the second partition;

determining whether the data read from the first physical address is associated with the first logical address based at least in part on reading the data; and transmitting the data to a host system based at least in part on determining that the data read from the first physical address is associated with the first logical address.

* * * * *